United States Patent [19]

Jaeger

[11] 3,904,644

[45] Sept. 9, 1975

[54] PERFLUOROALKYLMONOCARBOXYLIC ACID ESTERS CONTAINING N,N'-DISUBSTITUTED HYDANTOIN GROUPS AND GLYCIDYL GROUPS

[75] Inventor: Horst Jaeger, Bettingen, Switzerland

[73] Assignee: Ciba-Geigy AG, Basel, Switzerland

[22] Filed: Sept. 6, 1972

[21] Appl. No.: 286,797

Related U.S. Application Data

[62] Division of Ser. No. 95,340, Dec. 4, 1970, abandoned.

[30] Foreign Application Priority Data

Dec. 10, 1969  Switzerland...................... 18400/69
Feb. 9, 1970  Switzerland......................... 1827/70

[52] U.S. Cl. .............. 260/309.5; 106/2; 117/135.5; 117/138.5; 117/139.5 A; 117/139.5 CQ; 117/142; 117/154; 252/8.57; 252/8.8
[51] Int. Cl.$^2$...................................... C07D 233/72
[58] Field of Search................................. 260/309.5

[56] References Cited

UNITED STATES PATENTS

| | | | |
|---|---|---|---|
| 3,449,353 | 6/1969 | Porret et al...................... | 260/309.5 |
| 3,542,803 | 11/1970 | Porret............................. | 260/309.5 |
| 3,592,823 | 7/1971 | Porret............................. | 260/309.5 |
| 3,629,263 | 12/1971 | Batzer et al...................... | 260/309.5 |

OTHER PUBLICATIONS

Haubein et al., Chem. Abstr. Vol. 72, No. 12720j (1970).

Primary Examiner—Natalie Trousoe
Attorney, Agent, or Firm—Joseph G. Kolodny; Prabodh I. Almaula; Michael W. Glynn

[57] ABSTRACT

Perfluoroalkylmonocarboxylic acid esters from N-heterocyclic epoxides are provided. These esters contain a perfluoro alkyl radical, which is bonded directly or via an alkylene group with 1 to 10 carbon atoms to a carboxyl group. This carboxyl group is bonded in an ester-like manner to an acyclic, aliphatic radical substituted in the 2-position to the ester bridge by a free, etherified or esterified hydroxyl group. This latter radical being bonded to a ring nitrogen atom of a N-heterocyclic radical, which in turn at least by its second ring nitrogen atom is bonded to an acyclic aliphatic radical which contains an epoxide group in the terminal position or is linked to a an acyclic aliphatic radical which is in turn bonded in an esterlike manner to a perfluoroalkyl radical. These fluoro compounds are manufactured from the corresponding perfluoroalkylcarboxylic acids and epoxides and are used for finishing of porous and non-porous substrates, especially for producing oleophobic finishes on textiles.

12 Claims, No Drawings

PERFLUOROALKYLMONOCARBOXYLIC ACID ESTERS CONTAINING N,N'-DISUBSTITUTED HYDANTOIN GROUPS AND GLYCIDYL GROUPS

CROSS-REFERENCES TO RELATED APPLICATIONS

This is a division of application Ser. No. 95,340, filed Dec. 4, 1970, now abandoned.

The invention provides perfluoroalkylmonocarboxylic acid esters that (a) contain at least one perfluoroalkyl radical with 4 to 14 carbon atoms which is bonded directly or via an alkylene group with 1 to 10 carbon atoms to a carboxyl group, which is bonded in an ester-like manner to (b) an acyclic, aliphatic radical substituted in the 2-position to the ester bridge by an optionally etherified or esterified hydroxyl group, the radical being bonded to (c) a ring nitrogen atom of a 5-membered N-heterocyclic radical containing two ring nitrogen atoms, this heterocyclic radical being in turn bonded, at least by its second ring nitrogen atom, (1) to an acyclic aliphatic radical which contains an epoxide group in the terminal position or (2) linked to a radical as defined under (b), which is in turn bonded in an ester-like manner to a radical as defined under (a).

The alkylene group via which the perfluoroalkyl radical can be bonded to the carboxyl group can be linear or cyclic. Thus one is concerned, for example, with cycloalkylene radicals with 5 or 6 ring carbon atoms, such as the cyclohexylene radical, or especially with n-alkylene radicals with 1 to 10 carbon atoms.

The perfluoroalkylmonocarboxylic acid esters preferably correspond to the formula

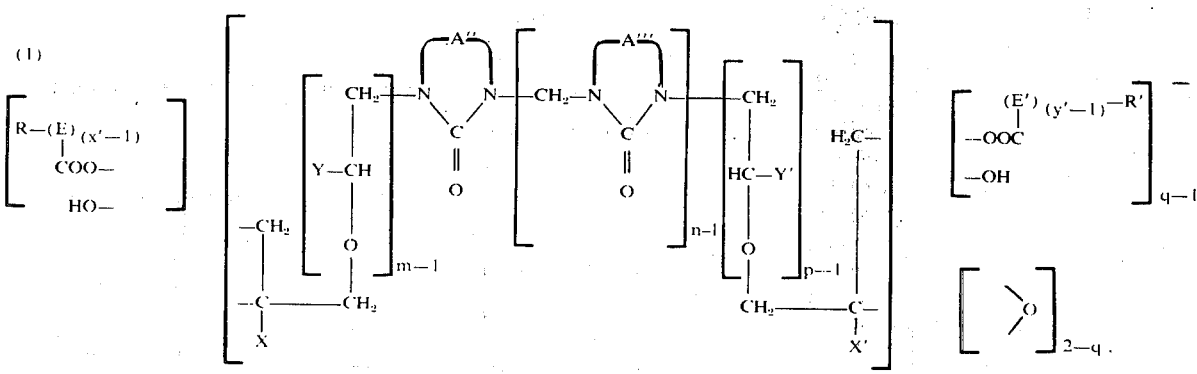

wherein R and R' each represent a perfluoroalkyl radical with 4 to 14 carbon atoms, E and E' each represent a cycloalkylene radical with 5 or 6 ring carbon atoms or an n-alkylene radical with 1 to 10 carbon atoms, X and X' each represent a methyl group or preferably a hydrogen atom, Y and Y' each represent a hydrogen atom or preferably a methyl group, A'' and A''' each represent a radical of the formula

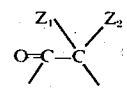

in which $m, n, p, q, x'$ and $y'$ each are 1 or 2, and $Z_1$ and $Z_2$ each denote a hydrogen atom or an alkyl radical with 1 to 4 carbon atoms.

Preferably, the perfluoroalkylmonocarboxylic acid esters correspond to the formula

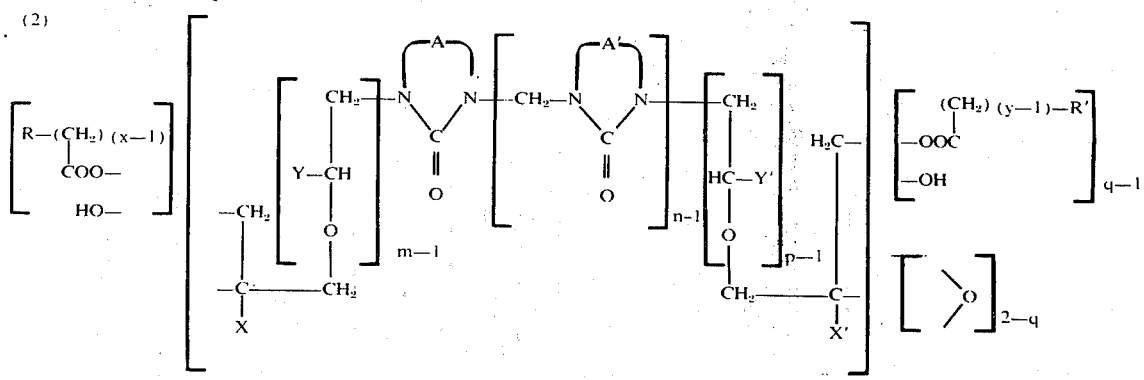

wherein R, R', X, X', Y, Y', $m, n, p$ and $q$ have the indicated meaning, A and A' each denote a radical of the formula

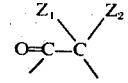

and $x$ and $y$ each denote an integer having a value of 1 to 11.

In the case of five-membered rings, the radicals $Z_1$ and $Z_2$ preferably represent hydrogen atoms.

Where $q$ is 2, the compounds of formula (1) are N-heterocyclic esters with at least two perfluoroalkylmonocarboxylic acid groups, and if $q$ is 1, the compounds are esters with at least one perfluoroalkylmonocarboxylic acid group.

$x$ and $y$ are preferably integers having a value of 1 to 3, or especially 1.

If $x$ and $y$ are greater than 1, they preferably represent integers having a value of 3 to 5.

(6)

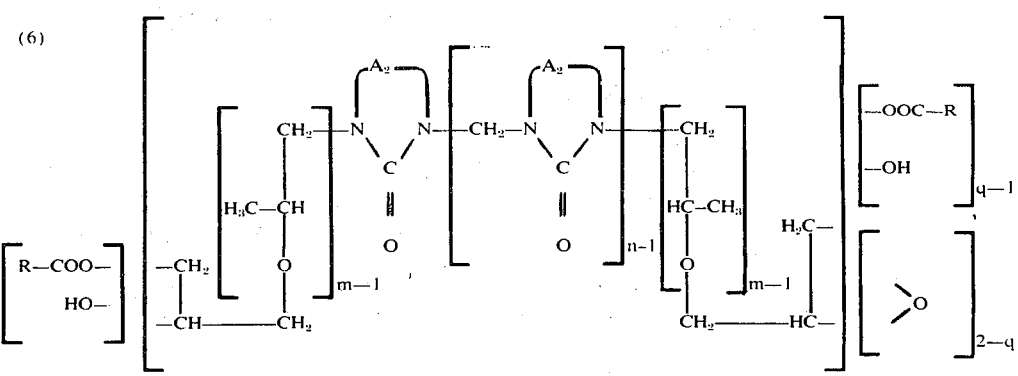

Particular interest attaches to perfluoroalkylmonocarboxylic acid esters of the formula (3)

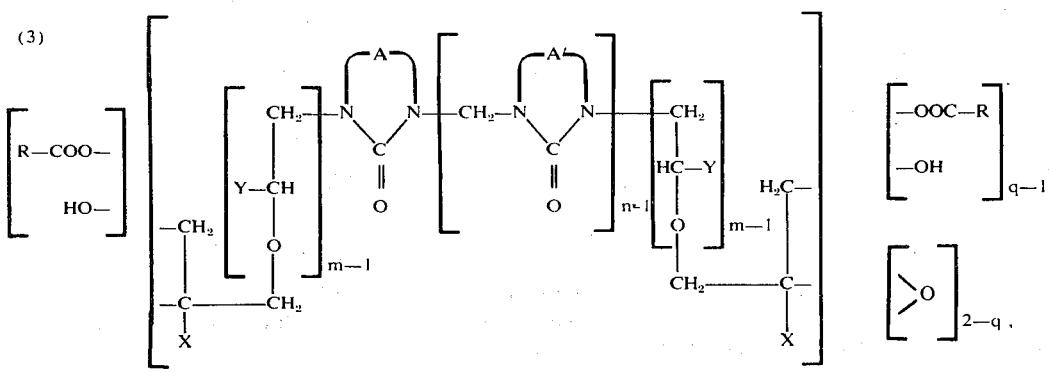

wherein R, X, Y, A, A', $m$, $n$ and $q$ have the meaning indicated.

Particularly suitable perfluoroalkylmonocarboxylic acid esters correspond to the formula (4)

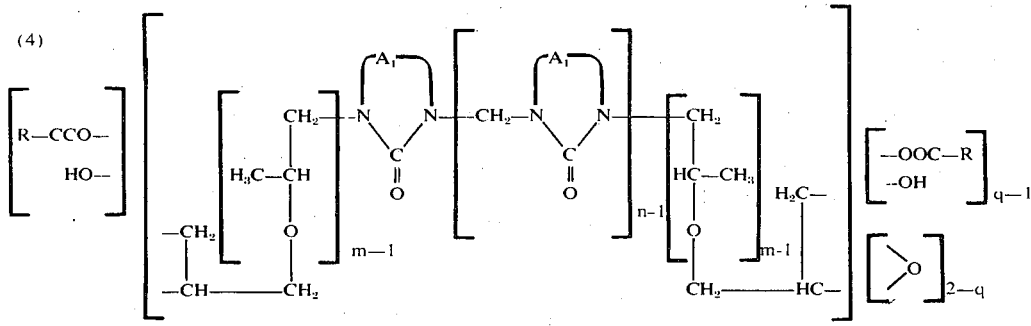

wherein $A_1$ denotes a radical of the formula

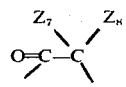

with $Z_7$ and $Z_8$ each representing a methyl group or especially a hydrogen atom, and R, $m$, $n$ and $q$ having the meaning indicated.

Perfluoroalkylmonocarboxylic acid esters of the formula wherein $A_2$ represents a radical of the formula

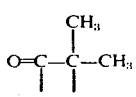

and R, $m$, $n$ and $q$ have the meaning indicated, lay claim to particular interest.

Perfluoroalkylmonocarboxylic acid esters of the formula (7)

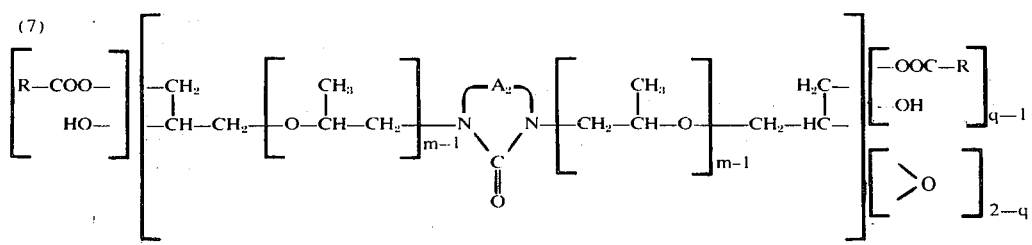

or of the formula (8)

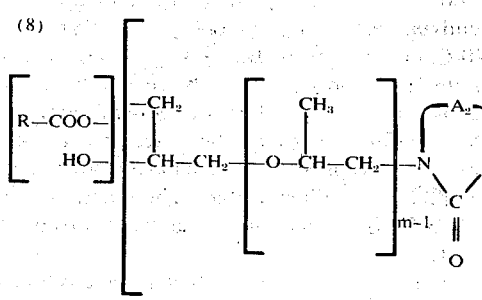

wherein R, $m$, $q$ and $A_2$ have the meaning indicated, are here preferred.

The perfluoroalkyl radical of the perfluoroalkyl-monocarboxylic acid esters according to the invention preferably contains 5 to 11, or especially 7 to 9, carbon atoms. The perfluoroalkyl radical can be either branched or unbranched, that is to say iso-perfluoroalkyl radicals, for example of the formula (9) 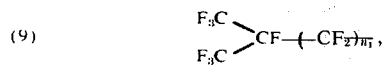

wherein $n_1$ represents an integer having a value of 1 to 11, can also be present. However, n-perfluoroalkyl radicals are always preferred. Further, the perfluoroalkyl radical can also be a ω-H-perfluoroalkyl radical which possesses a hydrogen atom in the terminal position.

The perfluoroalkylmonocarboxylic acid esters according to the invention are practically always isomer mixtures, in that they are manufactured from epoxides and on opening the epoxide ring the esterification with the corresponding perfluoroalkylmonocarboxylic acid can take place on either of the adjacent carbon atoms of the epoxide group.

As examples of perfluoroalkylmonocarboxylic acid esters according to the invention, the following compounds may be quoted (for reasons of simplicity, only one isomeric form is given):

(10.1) 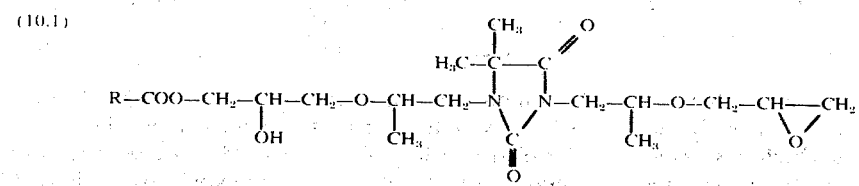

(10.2) 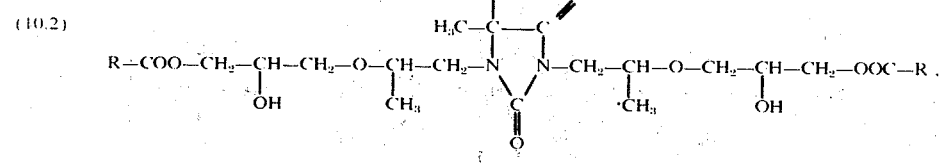

(10.5) 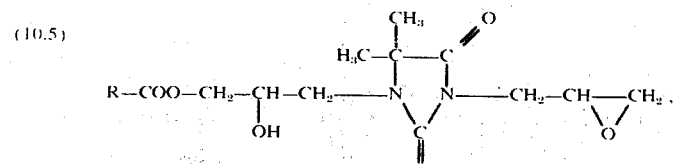

(10.6) 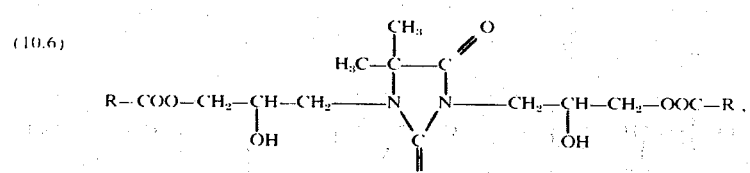

(10.7) 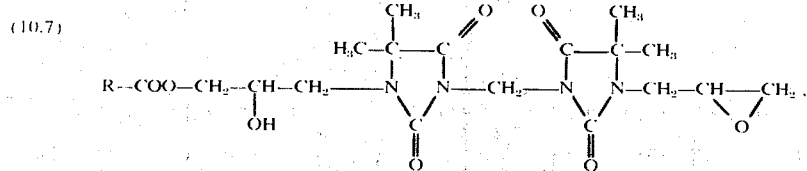

(10.8) 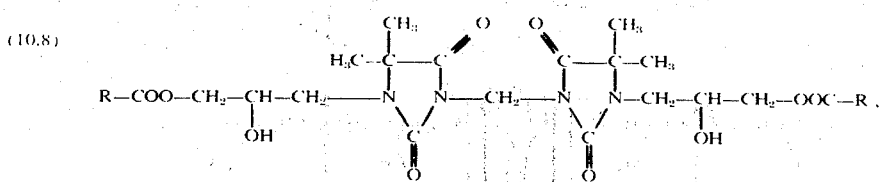

wherein R has the meaning indicated.

The perfluoroalkylmonocarboxylic acid esters according to the invention are appropriately manufactured according to methods which are in themselves known, by (1) reacting at least one perfluoroalkylmonocarboxylic acid with 4 to 14 carbon atoms in the perfluoroalkyl radical, which is bonded directly or via an alkylene bridge with 1 to 10 carbon atoms to the carboxyl group, with (2) at least one N-heterocyclic, 5-membered epoxide containing 2 ring nitrogen atoms, which are each bonded to an epoxide group via an acyclic, aliphatic radical, and (3) subsequently optionally etherifying or esterifying the hydroxyl groups produced in this reaction with an alkanol or an alkylcarboxylic acid, respectively.

Depending on the molar ratio, compounds are thereby obtained which contain one, two or, where relevant, three perfluoroalkylmonocarboxylic acid esters in the molecule.

The reaction temperature is between 20° and 100°C, preferably between 20° and 70°C. To manufacture perfluoroalkylcarboxylic acid esters which possess an alkylene group between the perfluoroalkyl radical and the carboxyl group, it is advisable to carry out the process at 60° to 90°C. To manufacture corresponding compounds without an alkylene group, temperatures of 20° to 40°C as a rule suffice. Depending on the reaction temperature and the reactivity of the reactants, the reaction takes 1 to 24 hours, but is in general complete after 4 to 8 hours. Preferably, the reaction is allowed to take place in the presence of a catalyst, such as for example anhydrous sodium acetate. The reaction is appropriately carried out in a solvent, such as for example ethyl acetate.

The new perfluoroalkylmonocarboxylic acid esters of formula (1) are accordingly advantageously manufactured by reacting at least one perfluoroalkylmonocarboxylic acid of formula

(11) $R-(E)_{x'-1}-COOH$ as component (1) with an epoxide of formula (12)

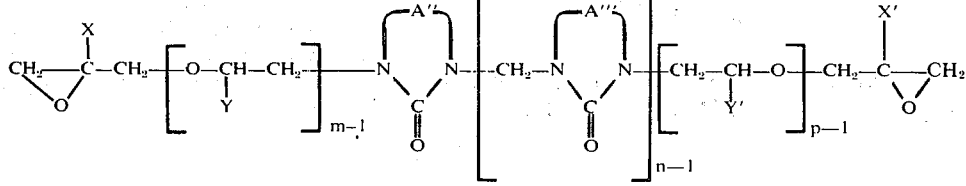

as component (2), wherein R, E, X, X', Y, Y', A'', A''', $x'$, $m$, $n$ and $p$ have the indicated meaning.

Epoxides of formulae (13) to (19) are used for the manufacture of the perfluoroalkylmonocarboxylic acid esters of formulae (2) to (8).

(13)

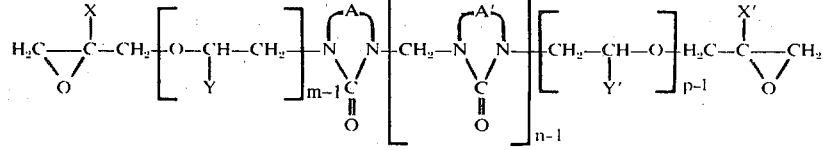

(14)

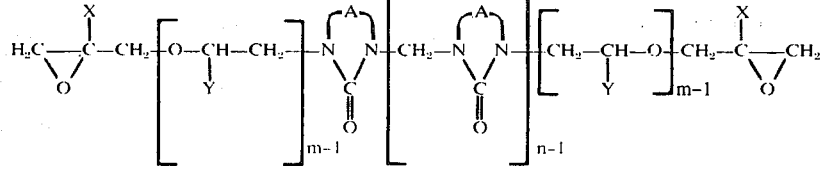

(15)

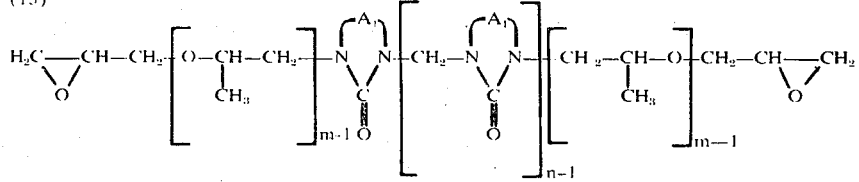

(17)

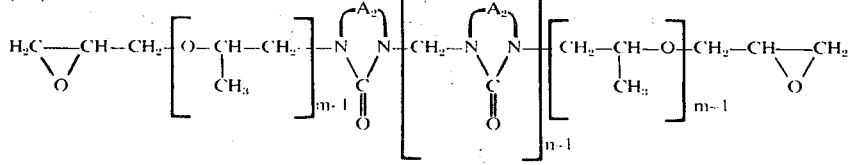

(18)

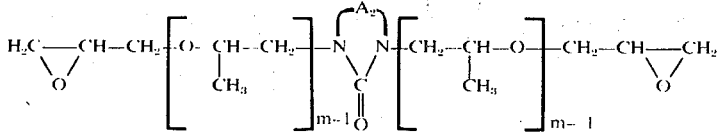

(19)

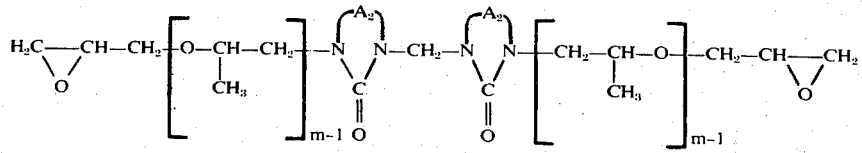

In these formulae, A, A', A₁, A₂, X, X', Y, Y', $p$, $m$ and $n$ have the meaning indicated.

The preparation of the particularly interesting perfluoroalkylmonocarboxylic acid esters of which the perfluoroalkyl radical contains 5 to 11, preferably 7 to 9, carbon atoms, is achieved by reacting a perfluoroalkylmonocarboxylic acid having 5 to 11, preferably 7 to 9, carbon atoms in the perfluoroalkyl radical, with the component (2). In formula (10), $x$ is preferably 1, 2 or 3, or especially 1.

Suitable epoxides for example correspond to the formulae tain several functional groups capable of reaction with hydroxyl groups, such as 1,2-epoxide groups, isocyanate groups, acrylyl groups, methylol groups, methylol groups etherified with lower alcohols, aldehyde groups, easily hydrolysable ester groups, amino groups and the like. Such polyfunctional compounds are, therefore, suitable for use as crosslinking components or curing components for the perfluoroalkylmonocarboxylic acid esters, according to the invention, that contain hydroxyl groups.

As such crosslinking components there may especially be mentioned:

(20.3)

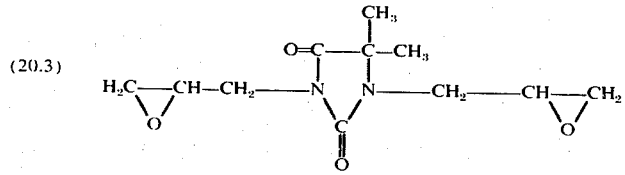

(20.4)

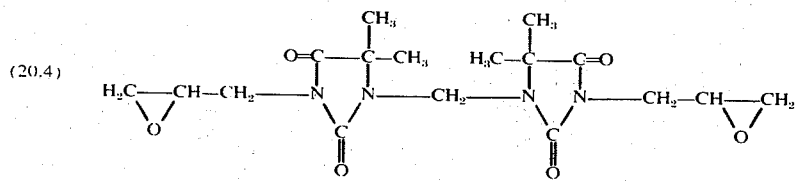

(20.5)

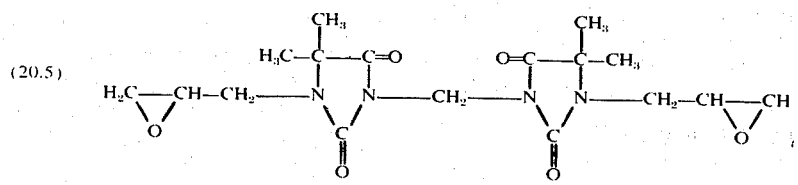

(20.6)

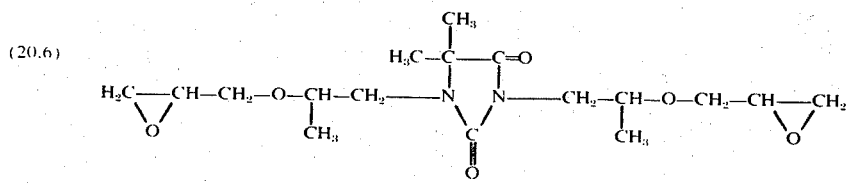

(20.7)

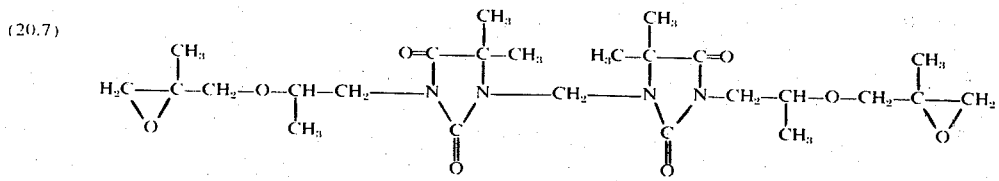

The epoxides used for the manufacture of the perfluoroalkylmonocarboxylic acid esters according to the invention are known and are manufactured according to methods which are in themselves known, by reacting the corresponding N-heterocyclic compound with an epihalogenohydrin, for example epichlorohydrin or β-methylepichlorohydrin.

As a result of the presence of free hydroxyl groups, the perfluoroalkylmonocarboxylic acid esters according to the invention react with compounds which con- Epoxide compounds, especially polyglycidyl ethers, such as butanediol diglycidyl ether and diglycidyl ether, diisocyanates and polyisocyanates, such as o-, m- and p-phenylenediisocyanate, toluylene-2,4-diisocyanate and 1,5-naphthylenediisocyanate; acrylyl compounds such as methylenebisacrylamide and symmetrical triacrylylperhydrotriazine; poly-(2,3-di-hydro-1,4-pyranyl) compounds, such as (2,3-dihydro-1',4'-pyran-2'-yl)-methyl ester; aldehydes, such as formaldehyde or glyoxal, and soluble phenol-formaldehyde condensation products, such as novolaks or resols. Aminoplasts that are soluble in water or in organic solvents are preferably used as crosslinking components.

Possible aminoplasts are formaldehyde condensation products of urea, thiourea, guanidine, ethyleneurea, glyoxalmonourein, acetylenediurea and dicyandiamide, and also of aminotriazines, such as melamine, or of guanamides, such as acetoguanamine, benzoguanamine, tetrahydrobenzoguanamide or formoguanamine, as well as their ethers with alcohols, such as methyl, ethyl, propyl, allyl, butyl, amyl and hexyl alcohol, cyclohexanol, benzyl alcohol, lauryl alcohol, stearyl alcohol, oleyl alcohol or abietyl alcohol. In addition to the ether radicals, the condensation products can also contain radicals of higher-molecular acids, such as for example stearic acid.

Particularly good technical results in the field of textile finishing are obtained on using water-soluble condensation products of formaldehyde and melamine, or especially the esterification product or etherification product from hexamethanolmelamine-methyl-ethers and stearic acid or stearyl alcohol, as crosslinking components, for example hexamethanolmelamine-pentamethyl-ether, since an oleophobic effect and a hydrophobic effect can thus be simultaneously achieved. It is frequently also advantageous to employ the perfluoroalkylmonocarboxylic acid esters as precondensates with crosslinking agents, for example amines or aminoplast precondensates.

The perfluoroalkylmonocarboxylic acid esters can also be used as a mixture with polymers not containing fluorine. Polymers not containing fluorine which are very suitable are here, for example, the homopolymers of acrylic acid esters or methacrylic acid esters, such as poly(ethyl acrylate) or copolymers of acrylic acid esters or methacrylic acid esters with methylolacrylamide or methylolmethacrylamide.

The perfluoroalkylmonocarboxylic acid esters according to the invention can, by virtue of their reactive groupings, be used for the treatment of porous and non-porous substrates, preferably for producing oleophobic finishes thereon, it being possible to incorporate the esters into the material in question or above all to apply them to its surface. By porous substrates, leather or preferably fibre materials such as textiles and paper are to be understood; possible non-porous materials are plastics and above all surfaces of metals and glass.

The finishing of the substrate with the perfluoroalkylmonocarboxylic acid esters according to the invention can be carried out in a process step by itself, but also in the same process step as the application of further finishing agents, for example together with known agents for imparting hydrophobic properties, such as paraffin emulsions, or solutions or emulsions of fatty acid condensation products, for example with aminoplast precondensates, and as mentioned above.

Further, a so-called "soil release" and "anti-soiling" effect can also be achieved with the perfluoro compounds according to the invention, especially on cotton.

At the same time as imparting oleophobic properties, these perfluoro compounds also show hydrophilic properties. For rendering oleophobic, the substrates can be treated either with solutions or with dispersions or emulsions of the perfluoro compounds. Perfluoroalkylmonocarboxylic acid esters can, for example, also be applied to the textile material in a solution with an organic solvent, and be heat-fixed to the fabric after evaporation of the solvent.

Particular interest as regards finishing by means of the perfluoroalkylmonocarboxylic acid esters according to the invention attaches to textile materials. Examples of such materials include those from native regenerated cellulose, such as cotton, linen or rayon, viscose staple, or cellulose acetate. However, textiles made of wool, synthetic polyamides, polyesters or polyacrylonitrile can also be used. Mixed woven fabrics or mixed knitted fabrics of cotton-polyester fibres can also advantageously be finished. The textiles can here be in the form of filaments, fibres or flocks, but preferably of woven fabrics or knitted fabrics.

Preparations which contain the perfluoro compound according to the invention can be applied to the substrate in the customary manner which is in itself known. Woven fabrics can for example be impregnated according to the exhaustion process, or on a padder which is fed with the preparation at room temperature. The impregnated material is thereafter dried at 60° to 120°C and subsequently, where appropriate, also subjected to a heat treatment at above 100°C, for example at 120° to 200°C.

The textiles treated in this way as a rule show an oil-repellent action, and where the preparation also contains an agent for conferring hydrophobic properties, this action is coupled with a water-repellent action.

EXAMPLE 1

21.9 g of N,N'-dipropylene-diglycidyl-ether-5,5-dimethylhydantoin and 41.4 g of perfluorocaprylic acid are dissolved in 100 ml of ethyl acetate at room temperature, with the addition of 2 g of anhydrous sodium acetate.

The temperature rises to 26°C and the reaction temperature is kept constant at 35°C. After 5 hours' reaction, the epoxide content is 0%. The solution is concentrated in vacuo at 35°C. The residue is taken up in 300 ml of diethyl ether, washed 3 times with 50 ml of water, and dried with $Na_2SO_4$. The solution is concentrated in vacuo at 35°C and yields a viscous, light yellow phase. Weight 42.5 g = 71.8 % of theory.

Recording a mass spectrum confirms the structure, in that it shows a molecular weight of 1184, which corresponds to a product of formula (I)

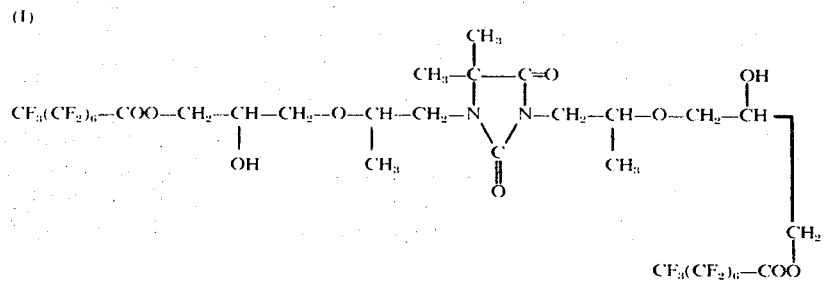

EXAMPLE 2

43.8 g of N,N'-dipropylene-diglycidyl-ether-5,5-dimethylhydantoin and 41.4 g of perfluorocaprylic acid are dissolved in 100 ml of ethyl acetate at room temperature, with the addition of 2.0 g of anhydrous sodium acetate.

The temperature rises to 29°C and the reaction temperature is kept constant at 35°C. After 12 hours' reaction, the epoxide content is 53.8%, relative to the expected product. The solution is concentrated in vacuo at 35°C. The residue is (a) taken up in 300 ml of diethyl ether, washed 3 times with 50 ml of water, and dried with $Na_2SO_4$. The solution is concentrated in vacuo at 35°C and yields a light yellow, viscous phase. Weight 42.3 g = 55% of theory.

Recording a mass spectrum confirms the structure, in that it shows a molecular weight of 770, which corresponds to a product of the formula (II)

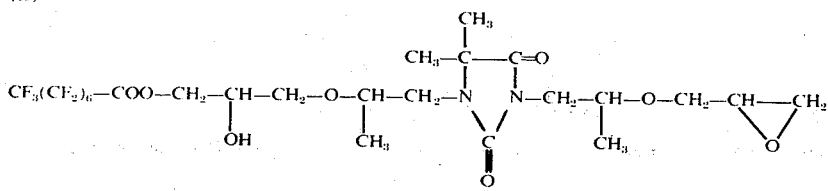

EXAMPLE 6

14.3 g of N,N'-diglycidyl-5,5-dimethylhydantoin and 41.4 g of perfluorocaprylic acid are dissolved in 100 ml of ethyl acetate at room temperature, with the addition of 2.0 g of anhydrous sodium acetate.

The temperature rises to 30°C, and the reaction temperature is kept constant at 35°C. After 7 hours' reaction, the epoxide content is 0%. The solution is concentrated in vacuo at 40°C. The residue is (a) taken up in 300 ml of diethyl ether, washed 3 times with 50 ml of water and dried with $Na_2SO_4$. The solution is concentrated in vacuo at 40°C and yields a yellow, clear, viscous phase. Weight 47.5 g = 80% of theory.

Recording a mass spectrum confirms the structure, in that it shows a molecular weight of 1068, which corresponds to a product of the formula (VI)

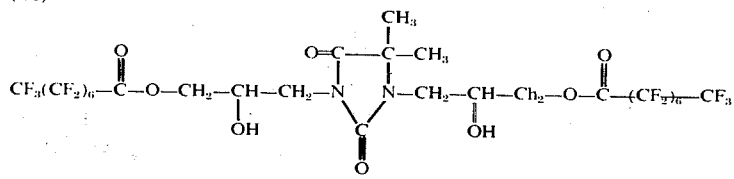

EXAMPLE 5

28.6 g of N,N'-diglycidyl-5,5-dimethylhydantoin and 41.4 g of perfluorocaprylic acid are dissolved in 100 ml of ethyl acetate at room temperature, with the addition of 2.0 g of anhydrous sodium acetate.

The temperature rises to 30°C, and the reaction temperature is kept constant at 35°C. After 10 hours' reaction the epoxide content is 26.2%, relative to the expected product. The solution is concentrated in vacuo at 40°C. The residue is taken up in 300 ml of diethyl ether, washed 3 times with 50 ml of water, dried with $Na_2SO_4$ and concentrated in vacuo at 40°C.

This yields a light yellow, clear, viscous phase. Weight 44 g = 67.3% of theory.

Recording a mass spectrum confirms the structure, in that it shows a molecular weight of 654, which corresponds to a product of the formula (V)

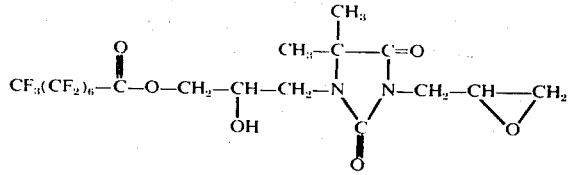

EXAMPLE 7

14.3 g of epoxide of the formula (20.3) and 22.1 g of 2,2,3,3-H-pentadecafluorodecylic acid are dissolved in 100 ml of ethyl acetate at room temperature, with the addition of 1 g of anhydrous sodium acetate. The temperature rises to 30°C. The reaction temperature is kept constant at 40°C, and after 18 hours' reaction the epoxide content is 40%. The solution is concentrated in vacuo at 40°C. The residue is taken up in 100 ml of diethyl ether and washed 3 times with 20 ml of water, and yields a yellow, viscous phase. Weight 20.5 g = 73% of theory.

Recording a mass spectrum confirms the structure, in that it shows a molecular weight of 682, which corresponds to a product of the formula (VII)

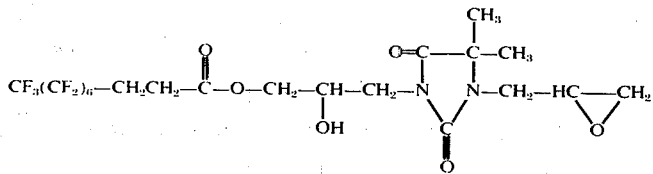

EXAMPLE 9

48 g of diglycidylhydantoin of the formula (20.3) and 100 g of perfluoroalkylcarboxylic acid[r] are dissolved in 200 ml of ethyl acetate at room temperature, with the addition of 2 g of anhydrous sodium acetate.

[r]The perfluoroalkylalkylcarboxylic acid used has the following composition according to a gas chromatogram and mass spectrum:

| | | | | |
|---|---|---|---|---|
| 21% $C_6F_{13}C_2H_4COOH$ | M 392 | 4.5% $C_6F_{13}C_4H_8COOH$ | M 420 |
| 48% $C_8F_{17}C_2H_4COOH$ | M 492 | 9% $C_8F_{17}C_4H_8COOH$ | M 520 |
| 12.5% $C_{10}F_{21}C_2H_4COOH$ | M 592 | 3% $C_{10}F_{21}C_4H_8COOH$ | M 620 |

The reaction temperature is kept constant at 75°C. After 6 hours' reaction the epoxide constant is 115 %, relative to one epoxy group. The solution is concentrated in vacuo at 40°C. The residue is insoluble in water and is taken up in 300 ml of diethyl ether, washed 3 times with 50 ml of water, dried with Na₂SO₄ and concentrated, yielding a yellow, viscous phase. Weight 112.5 g = 76.8% of theory.

Recording a mass spectrum confirms the structure, in that it shows molecular weights of 832, 732, 632 and 660, which corresponds to a product of the formula (IX)

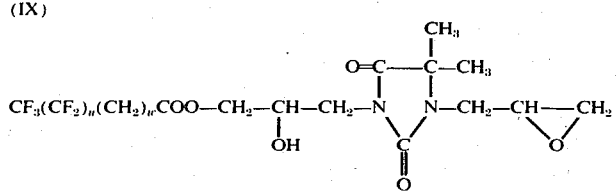

acetate at room temperature, with the addition of 2 g of anhydrous sodium acetate.

The reaction temperature is kept constant at 80°C. After 6 hours' reaction the epoxide content is 0%. The solution is concentrated in vacuo at 70°C. The residue is taken up in 200 ml of diethyl ether, washed 3 times with 20 ml of water, dried and concentrated, and yields a highly viscous, brown phase. Weight 39.4 g = 49.6 % of theory. The product corresponds to the formula (XIII)

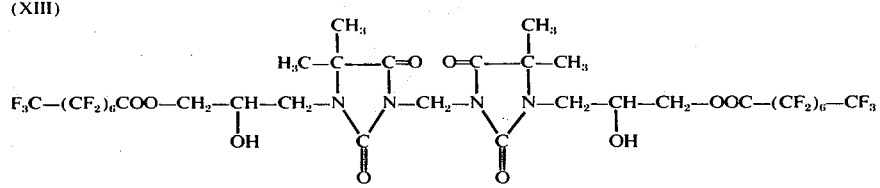

EXAMPLE 17

Liquors of the following composition are prepared with the products of the formulae (I) to (VI):

Table

| Constituents | Liquor | | | | | | | | | | | | |
|---|---|---|---|---|---|---|---|---|---|---|---|---|---|
| | A | B | C | D | E | F | G | H | I | J | K | L | M |
| Product of formula (I), g | 2 | 1 | — | — | — | — | — | — | — | — | — | — | — |
| Product of formula (II), g | — | — | 2 | 1 | — | — | — | — | — | — | — | — | — |
| Product of formula (V), g | — | — | — | — | — | — | — | — | 2 | 1 | — | — | — |
| Product of formula (VI), g | — | — | — | — | — | — | — | — | — | — | 2 | 1 | — |
| Product of formula (VII), g | — | — | — | — | — | — | — | — | — | — | — | — | 2 |
| Ethyl acetate, ml | 10 | 10 | 10 | 10 | | | | | 10 | 10 | 10 | 10 | 10 |
| MgCl₂, g | 0.2 | 0.2 | 0.2 | 0.2 | 0.2 | 0.2 | 0.2 | 0.2 | 0.2 | 0.2 | 0.2 | 0.2 | 0.2 |
| Citric acid, g | 0.2 | 0.2 | 0.2 | 0.2 | 0.2 | 0.2 | 0.2 | 0.2 | 0.2 | 0.2 | 0.2 | 0.2 | 0.2 |
| HMA (*) | — | 1 | — | 1 | — | 1 | — | 1 | — | 1 | — | 1 | — |
| Water, g | 0.5 | 0.5 | 0.5 | 0.5 | 10.0 | 10.0 | 10.0 | 0.5 | 0.5 | 0.5 | 0.5 | 0.5 | 0.5 |

(*) HME = hexamethylolmelamine-pentamethyl ether

The "parent peaks" 760 and 860, which would correspond to the products with $w = 4$; $u = 7,9$, are not visible in the mass spectrum recording of this mixture.

EXAMPLE 13

38 g of epoxide of the formula (20.5) and 41.4 g of perfluorocaprylic acid are dissolved in 300 ml of ethyl Pieces of fabric of cotton, cotton-polyester, synthetic polyamide, polyester and wool gaberdine are successively dipped into this liquor and thus impregnated with the perfluoro compound.

A glass plate is also coated with these liquors. The fabric samples and glass samples are thereafter dried for 5 minutes at 140°C in vacuo.

The assessment of the oil-repellent effect is carried out according to the so-called "3M oil repellency test" (Crajech and Petersen, Textile Research Journal 32, page 320 to 331 (1960)) using heptane-Nujol mixtures. In the assessment, 150 denotes the best obtainable rating. The individual samples are assessed immediately after drying, that is to say as they are, and after washing in boiling trichloroethylene for 5 minutes.

Table II

| Substrate | Rating Achieved with Liquors | | | | | | | | |
|---|---|---|---|---|---|---|---|---|---|
| | A | B | C | D | I | J | K | L | M |
| Cotton: | | | | | | | | | |
| As obtained | 90 | 100 | 50 | 50 | 100 | 130 | 100 | 80 | 100 |
| after 1 × TCE | 90 | 70 | 60 | 60 | 110 | 120 | 110 | 60 | 110 |
| Cotton/Polyester: | | | | | | | | | |
| As obtained | 100 | 110 | 60 | 50 | 110 | 130 | 120 | 110 | 100 |
| after 1 × TCE | 110 | 80 | 60 | 60 | 130 | 130 | 120 | 80 | 90 |
| Polyester: | | | | | | | | | |
| As obtained | 110 | 110 | 90 | 80 | 120 | 130 | 120 | 110 | 110 |
| after 1 × TCE | 110 | 110 | 100 | 50 | 120 | 120 | 110 | 50 | 110 |
| Polyamide: | | | | | | | | | |
| As obtained | 110 | 110 | 80 | 80 | 110 | 110 | 110 | 100 | 100 |
| after 1 × TCE | 80 | 90 | 80 | 60 | 120 | 120 | 130 | 100 | 100 |
| Wool gaberdine: | | | | | | | | | |
| As obtained | 150 | 50 | — | — | 100 | 50 | 80 | 50 | 90 |
| after 1 × TCE | 60 | 60 | — | — | 110 | 90 | 70 | 50 | 80 |
| Glass: | | | | | | | | | |
| As obtained | 120 | — | 110 | — | 130 | 150 | 130 | — | — |
| The finishes are oleophobic and | hi | ho | hi | ho | hi | ho | hi | ho | hi | after 1 × TCE = after one wash in trichloroethylene
hi = hydrophilic
ho = hydrophobic

EXAMPLE 18

3 g of a paraffin emulsion (containing 10 parts of a condensation product from hexamethylolmelamine-hexamethyl-ether, stearic acid and stearic acid diglycidide, 10 parts of paraffin wax and 18 parts of a condensation product of hexamethylolmelamine-hexamethyl-ether, stearic acid and triethanolamine), 6 g of a 50% strength solution of 1 mol of hexamethylolmelamine-hexamethyl-ether and 1 mol of dimethylolethyleneurea, 0.1 g of $AlCl_3 + 6 H_2O$ and 0.75 g of acetic acid are emulsified in 90 ml of water.

The following are additionally emulsified in the solution:

a. 3 g of the end product according to Example 5, dissolved in 10 ml of water, or
b. 6 g of the end product according to Example 5, dissolved in 10 ml of water, or
c. 6 g of the end product according to Example 3, dissolved in 10 ml of water.

Pieces of fabric of cotton, cotton-polyester, synthetic polyamide, polyester and wool gaberdine are successively dipped into these liquors and thus impregnated with the perfluoro compound.

The fabrics are thereafter dried for 5 minutes at 130°C. The assessment of the oil-repellent effect is carried out as in Example 17.

The results are summarised in the table which follows:

| Substrate | Rating | | | | | |
|---|---|---|---|---|---|---|
| | As obtained | | | After 1 × trichloroethylene | | |
| | a | b | c | a | b | c |
| Cotton | 50 | 70 | 50 | 50 | 50 | 50 |
| Cotton/Polyester | 80 | 90 | 60 | 50 | 50 | 50 |
| Polyester | 100 | 120 | 80 | 50 | 50 | 50 |
| Polyamide | 120 | 120 | 80 | 50 | 50 | 50 |
| Wool gaberdine | 120 | 100 | 80 | 50 | 50 | 50 |

All finishes are also hydrophobic.

EXAMPLE 19 a. 145 g of substance of the formula (V) are dissolved in 80 ml of ethyl acetate, and 10 g of triethylenetetramine, dissolved in 20 ml of ethyl acetate, are added dropwise at room temperature.

The mixture is stirred for 4 hours at 70°C. Thereafter the ethyl acetate is distilled off under a vacuum from a water pump, in the process of which a highly viscous, light yellow substance is obtained. This substance is dissolved in 300 ml of diethyl ether and the unreacted triethylenetetramine is eluted with two 20 ml portions of water. The residue is freed of ether and yields 147.5 g of a viscous, yellow substance.

b. The same procedure as under a) is followed, but 13 parts of the substance of the formula (IV) and 120 ml of ethyl acetate are used. 141.0 g of a viscous, yellow substance are thus obtained.

c. to f. The following mixtures are warmed to 70°C for 15 to 20 minutes, so that a clear yellow solution is obtained:

| Constituents | Solution | | | |
|---|---|---|---|---|
| | c) | d) | e) | f) |
| Substance of the formula (IV), g | 56 | 61 | — | — |
| Substance of the formula (V), g | — | — | 36 | — |
| Substance of the formula (I), g | — | — | — | 30 |
| Hexamethylolmelamine-pentamethyl-ether, g | 35 | 30 | 16 | 10 |
| Methanol, ml | 100 | 100 | — | — |
| Yield, g | 93 | 70 | 38 | 35 |

The clear yellow solution is kept for a further 3 hours at 70°C and is cooled, and any methanol present is removed in vacuo; a highly viscous yellow substance is left, which is soluble in water.

The substances obtained according to Example 19a to f are used in liquors of the following composition (concentrations in g/l):

|                                          | A    | B    | C    | D    | E    | F    | G    | H    | I         | K    | L     | M    | N    |
|------------------------------------------|------|------|------|------|------|------|------|------|-----------|------|-------|------|------|
| Product from Example 19a                 | —    | —    | 6    | 60   | —    | —    | —    | —    | —         | —    | —     | —    | —    |
| Product from Example 19b                 | 6    | 60   | —    | —    | —    | —    | —    | —    | —         | —    | —     | —    | —    |
| Product from Example 19c                 | —    | —    | —    | —    | 20   | 30   | —    | —    | —         | —    | —     | —    | —    |
| Product from Example 19d                 | —    | —    | —    | —    | —    | —    | 20   | 30   | 30        | —    | —     | —    | —    |
| Product from Example 19e                 | —    | —    | —    | —    | —    | —    | —    | —    | —         | 20   | 30    | —    | —    |
| Product from Example 19f                 | —    | —    | —    | —    | —    | —    | —    | —    | —         | —    | —     | 20   | 30   |
| Water to make up to                      | 1000 ml | 1000 ml | 1000 ml | 1000 ml | 1000 ml | — | 1000 ml | 1000 ml | 1000 ml acetone | 1000 ml | Water | 1000 ml | — |
| Acetic acid, 10% strength                | 10   | 10   | 10   | 10   | —    | —    | —    | —    | 4         | —    | —     | —    | —    |
| Hexamethylolmelamine-pentamethyl-ether   | 80   | 80   | 80   | 80   | —    | —    | —    | —    | —         | —    | —     | —    | —    |
| Paraffin emulsion according to Example 18| 40   | 40   | 40   | 40   | —    | 40   | —    | 40   | 40        | —    | 40    | —    | 40   |
| AlCl₃ × 6 H₂O                            | 2    | 2    | 2    | 2    | —    | —    | —    | —    | —         | —    | —     | —    | —    |
| MgCl₂                                    | —    | —    | —    | —    | —    | —    | —    | —    | —         | —    | —     | —    | —    |

Pieces of fabric of cotton, cotton-polyester, synthetic polyamide, polyester and wool gaberdine are successively dipped into this liquor and thus impregnated with the perfluoro compound.

The fabrics are thereafter dried for 5 minutes at 130°C.

The assessment of the oil-repellent effect is carried out as indicated in Example 17. Additionally, the samples are also assessed after a SNV-3 wash (SNV-3 wash: wash in a bath containing 5 g of soap and 2 g of sodium carbonate per litre, for 30 minutes at 60°C).

The ratings achieved are given in the table which follows.

Pieces of fabric of cotton-polyester, synthetic polyamide, polyester and wool gaberdine are successively dipped into these liquors and thus impregnated with the perfluoro compound.

The fabrics are thereafter dried for 5 minutes at 130°C.

The assessment of the oil-repellent effect is carried out as indicated in Example 17. However, instead of washing with trichloroethylene, the fabrics are subjected to 1, 5 and 10 SNV-3 washes (compare Example 19). At the same time, the polyester/cotton fabrics were also tested for their "soil release," again after 1, 5 and 10 SNV-3 washes. The test was here carried out Rating Achieved with Liquors

| Substrate              | A   | B   | C   | D   | E   | F   | G   | H   | I   | K   | L   | M   | N   |
|------------------------|-----|-----|-----|-----|-----|-----|-----|-----|-----|-----|-----|-----|-----|
| Cotton, as obtained    | 100 | 100 | 100 | 110 | 80  | 50  | 90  | 60  | 50  | 80  | 60  | 80  | 60  |
| 1 × SNV 3              | 50  | 50  | 50  | 50  | 50  | —   | 50  | —   | —   | 50  | 50  | 50  | —   |
| 1 × TCE                | —   | —   | —   | —   | —   | —   | —   | —   | —   | —   | —   | —   | —   |
| Cotton/polyester as obtained | 100 | 100 | 100 | 110 | 100 | 50  | 100 | 50  | 80  | 100 | 60  | 100 | 50  |
| 1 × SNV 3              | 50  | 50  | 50  | 50  | 50  | —   | 50  | —   | —   | 50  | 50  | 80  | —   |
| 1 × Trichloroethylene  | —   | —   | —   | —   | —   | —   | —   | —   | —   | —   | —   | —   | —   |
| Polyester, as obtained | —   | —   | —   | —   | 90  | 50  | 90  | 50  | 50  | 80  | 50  | 100 | 50  |
| 1 × SNV 3              | —   | —   | —   | —   | 50  | —   | 90  | —   | —   | 50  | 50  | 80  | —   |
| 1 × Trichloroethylene  | —   | —   | —   | —   | —   | —   | —   | —   | —   | —   | —   | —   | —   |
| Polyamide, as obtained | —   | —   | —   | —   | 100 | 50  | 90  | 60  | 70  | 80  | 60  | 100 | 50  |
| 1 × SNV 3              | —   | —   | —   | —   | 50  | —   | 50  | —   | —   | 50  | 50  | 80  | —   |
| 1 × Trichloroethylene  | —   | —   | —   | —   | —   | —   | —   | —   | —   | —   | —   | —   | —   |
| Wool gaberdine, as obtained | — | — | — | — | 60  | 50  | 100 | 60  | 50  | 70  | 60  | —   | 50  |
| 1 × SNV 3              | —   | —   | —   | —   | —   | —   | 50  | —   | —   | 50  | 50  | —   | —   |
| 1 × Trichloroethylene  | —   | —   | —   | —   | —   | —   | —   | —   | —   | —   | —   | —   | —   |

EXAMPLE 20

The following liquors are prepared with the substances manufactured according to the instructions in Examples 9 and 13:

| Product from     | A    | B    | C    | O    | P    | Q    | R    |
|------------------|------|------|------|------|------|------|------|
| Example 9        | 10   | 20   | 15   |      |      |      |      |
| Example 13       |      |      |      | 10   | 20   | 10   | 20   |
| x)               |      |      |      |      |      | 100  | 100  |
| HME              | 50   | 50   | 50   | 50   | 50   |      |      |
| AlCl₃ × 6 H₂O    |      |      |      |      |      |      |      |
| MgCl₂            |      | 5    |      |      |      | 10   | 10   |
| Chloroacetic acid| 3    |      | 3    | 3    | 3    |      |      |
| Water            |      | 250  |      |      |      | 500  | 500  |
| Ethanol          | 1000 | 750  |      | 1000 | 1000 | 500  | 500  |
| Dioxane          |      |      | 1000 |      |      |      |      | x) 50% strength aqueous solution of hexamethylolmelamine-hexamethylether and dimethylolethyleneurea according to the so-called "stain release test method" AATCC 130 (1969).

All fabrics proved to have simultaneously an oleophobic and a hydrophilic finish.

| Substrate              | A   | B   | C   | O   | P   | Q   |
|------------------------|-----|-----|-----|-----|-----|-----|
| Cotton as obtained     | 110 | 120 | 110 | 100 | 100 | 100 |
| 1 × SNV3               | 100 | 110 | 100 | —   | —   | —   |
| 5 × SNV3               | —   | 90  | 100 | —   | —   | —   |
| 10 × SNV3              | —   | —   | 100 | —   | —   | —   |
| Cotton/polyester as obtained | 100 | — | — | 80 | 100 | — |
| 1 × SNV3               | 100 | —   | —   | —   | —   | —   |
| 5 × SNV3               | 110 | 80  | 90  | —   | —   | —   |
| 10 × SNV3              | 100 | 70  | —   | —   | —   | —   |

-Continued

| Substrate | A | B | C | O | P | Q |
|---|---|---|---|---|---|---|
| Cotton/Polyester | Soil Release (Best Rating = 5) | | | | | |
| A. Nujol as obtained | | | | | | |
| 1 × SNV | 5 | 4.3 | 4.8 | 4 | 4 | — |
| 5 × SNV | 4.5 | 4 | 4 | 3 | 3 | — |
| 10 × SNV | 4.8 | 3 | 3 | 2.5 | 2.5 | — |
| B. Skin fat | | | | | | |
| 1 × SNV | 4 | 4 | 4 | 3.5 | 3.5 | — |
| 5 × SNV | 3.5 | 3.5 | 3.5 | 3 | 3 | — |
| 10 × SNV | 3 | 3 | 3.5 | 3.5 | 3.5 | — |

EXAMPLE 21

The liquors listed in the table which follows are prepared with the substances of Examples 8 and 9 (amounts stated in g/l).

| | A | B | C | D | E |
|---|---|---|---|---|---|
| Product from Example 8 | 6 | 60 | 30 | — | — |
| Product from Example 9 | — | — | — | 60 | 60 |
| Water | Made up to 1000 ml | — | — | — | — |
| Acetic acid, 40% strength | 10 | 10 | 10 | — | — |
| *) | 80 | 80 | 60 | — | — |
| **) | 40 | 40 | 40 | — | — |
| AlCl$_3$.6 H$_2$O | 2 | 2 | 10 | — | — |
| MgCl$_2$ | — | — | — | — | — |
| Butadiene-styrene copolymer | — | — | — | 30 | 30 |
| Poly(octyl methacrylate) | — | — | — | 50 | 50 |
| Acetone | — | — | — | 1 g per 1000 ml | |
| n-Butanol | — | — | — | 4 g per 1000 ml | |
| Monochloroacetic acid | — | — | — | 3 | — |

*) see Example 20
**) Paraffin emulsion according to Example 18

Pieces of fabric of cotton, cotton-polyester, synthetic polyamide, polyester and wool gaberdine are successively dipped into this liquor and thus impregnated with the perfluoro compound.

The fabric samples are thereafter dried for 5 minutes at 130°.

The assessment of the oil-repellent effect is carried out as indicated in Example 17 and 19. The results are summarised in the table which follows.

| Substrate | Rating Achieved with Liquors | | | | |
|---|---|---|---|---|---|
| | A | B | C | D | E |
| Cotton | | | | | |
| as obtained | 80 | 110 | 110 | 100 | 140 |
| 1 × SNV3 | 100 | 100 | 100 | 80 | 120 |
| 5 × SNV3 | 60 | 70 | 100 | — | 100 |
| 9 × SNV3 | — | — | 100 | — | — |
| 1 × TR | 50 | 100 | — | 120 | — |
| Cotton/Polyester | | | | | |
| as obtained | 90 | 100 | 110 | 110 | — |
| 1 × SNV3 | 90 | 100 | 110 | 80 | — |
| 5 × SNV3 | 80 | 90 | 100 | 60 | — |
| 9 × SNV3 | — | — | 100 | — | — |
| 1 × TR | 90 | 110 | — | 110 | — |
| Polyester | | | | | |
| as obtained | 60 | 70 | 100 | 60 | — |
| 1 × SNV3 | 60 | 80 | 100 | 60 | — |
| 5 × SNV3 | 60 | 70 | 100 | 60 | — |
| 9 × SNV3 | — | — | — | — | — |
| 1 × TR | 70 | 80 | — | 80 | — |
| Polyamide | | | | | |
| as obtained | — | — | 100 | — | — |
| 1 × SNV3 | — | — | 100 | — | — |
| 5 × SNV3 | — | — | 100 | — | — |
| 9 × SNV3 | — | — | 100 | — | — |

-Continued

| Substrate | Rating Achieved with Liquors | | | | |
|---|---|---|---|---|---|
| | A | B | C | D | E |
| Wool gaberdine | — | — | 90 | — | — |
| 1 × SNV3 | — | — | 0 | — | — |

All finishes are also hydrophobic.

I claim:

1. Perfluoroalkylmonocarboxylic acid esters which correspond to the formula

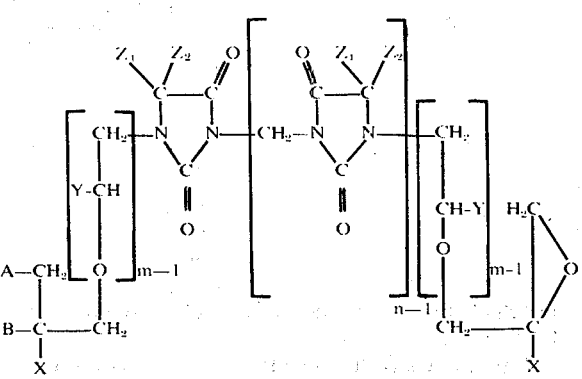

in which
one of A and B is —OH and the other is RE$_{(x'-1)}$-COO—,
R represents perfluoroalkyl with 4 to 14 carbon atoms,
E represents cyclopentylene or cyclohexylene or n-alkylene with 1 to 10 carbon atoms,
X and Y each represent hydrogen or methyl,
$m$, $n$ and $x'$ each are 1 or 2, and
$Z_1$ and $Z_2$ each denote hydrogen or alkyl with 1 to 4 carbon atoms.

2. Perfluoroalkylmonocarboxylic acid esters according to claim 1, wherein the perfluoroalkyl radicals contain 5 to 11 carbon atoms.

3. Perfluoroalkylmonocarboxylic acid esters according to claim 1, wherein the perfluoroalkyl radicals contain 7 to 9 carbon atoms.

4. Perfluoroalkylmonocarboxylic acid esters according to claim 1, which correspond to the formula

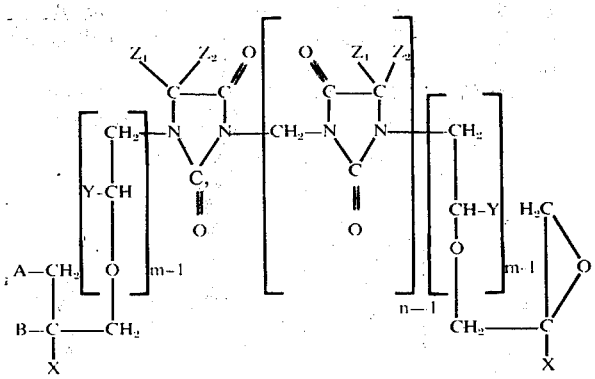

in which one of A and B is —OH and the other is R(CH$_2$)$_{x-1}$COO—, and $x$ denotes an integer having value of 1 to 11.

5. Perfluoroalkylmonocarboxylic acid esters according to claim 4, wherein $x$ is equal to 1.

6. Perfluoroalkylmonocarboxylic acid esters according to claim 1, which correspond to the formula

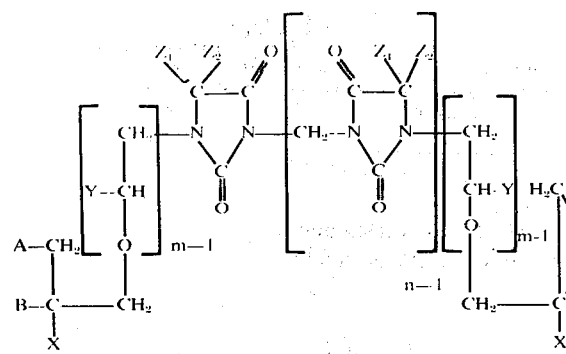

in which one of A and B is —OH and the other is RCOO—.

7. Perfluoroalkylmonocarboxylic acid esters according to claim 1, which correspond to the formula

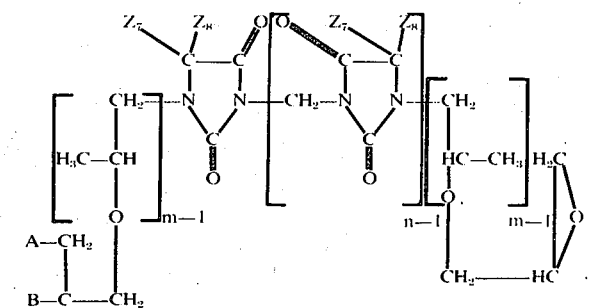

in which one of A and B is —OH and the other is RCOO—, and $Z_7$ and $Z_8$ each represent hydrogen or methyl.

8. Perfluoroalkylmonocarboxylic acid esters according to claim 1, which correspond to the formula

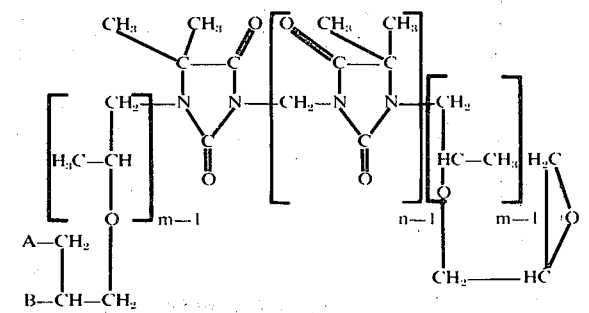

in which one of A and B is —OH and the other is RCOO—.

9. Perfluoroalkylmonocarboxylic acid ester according to claim 1, characterized in that it corresponds to the formula

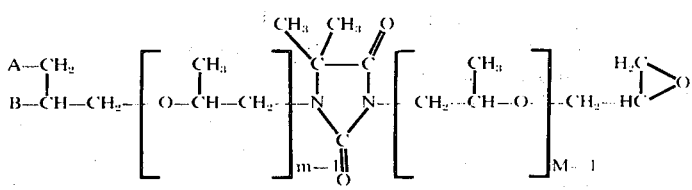

in which one of A and B is —OH and the other is RCOO—.

10. Perfluoroalkylmonocarboxylic acid esters according to claim 1, which corresponds to the formula

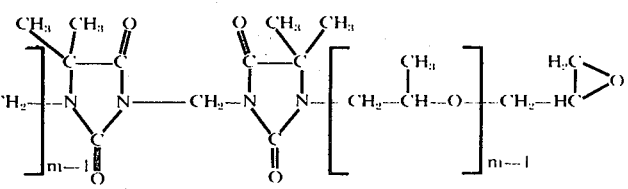

in which one of A and B is —OH and the other is RCOO—.

11. The perfluoroalkylmonocarboxylic acid ester according to claim 1 of the formula

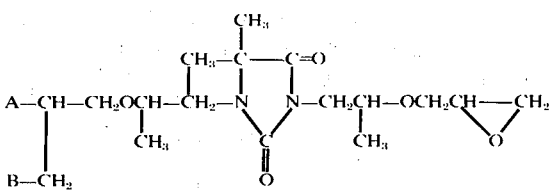

wherein one of A and B is —OH and the other is $F_3C(CF_2)_6COO—$.

12. The perfluoroalkylmonocarboxylic acid ester according to claim 1 of the formula

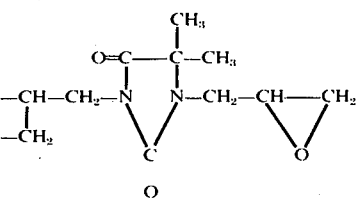

wherein one of A and B is —OH and the other is $F_3C(CF_2)_6CH_2CH_2COO—$.

* * * * *

UNITED STATES PATENT AND TRADEMARK OFFICE
CERTIFICATE OF CORRECTION

PATENT NO. : 3,904,644
DATED : September 9, 1975
INVENTOR(S) : Horst Jaeger

It is certified that error appears in the above-identified patent and that said Letters Patent are hereby corrected as shown below:

Column 22, claim 4, line 62, insert --- a --- at the end of the line.

Column 24, claim 9, line 21, delete "M-1" and insert --- m-1 ---.

Column 24, claim 11, line 41, on the left-hand side of the structural formula, delete the bond between $CH_3$ and $CH_2$.

Column 24, claim 12, lines 50-58, amend the structural formula to read:

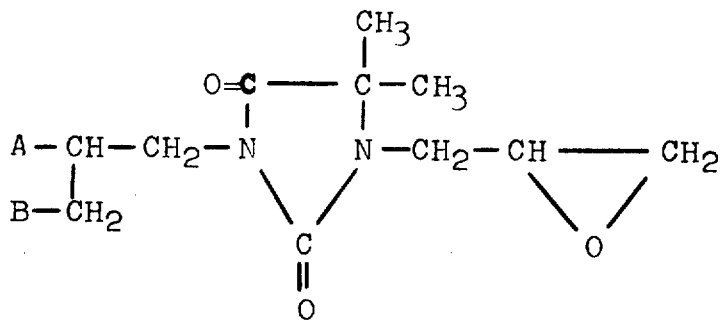

Signed and Sealed this eighteenth Day of May 1976

[SEAL]

Attest:

RUTH C. MASON
*Attesting Officer*

C. MARSHALL DANN
*Commissioner of Patents and Trademarks*